United States Patent
Nikhra et al.

(10) Patent No.: US 10,877,450 B2
(45) Date of Patent: Dec. 29, 2020

(54) WORKFLOW-BASED CHANGE MANAGEMENT AND DOCUMENTATION SYSTEM AND METHOD

(71) Applicant: Honeywell International Inc., Morris Plains, NJ (US)

(72) Inventors: Abhishek Nikhra, Bangalore (IN); Manas Dutta, Bangalore (IN); Ramakrishnan Ganapathi, Banglaore (IN); Sreedhara Reddy Mallavarpu, Bangalore (IN); Malathi Naidu, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 774 days.

(21) Appl. No.: 15/226,753

(22) Filed: Aug. 2, 2016

(65) Prior Publication Data
US 2018/0039247 A1    Feb. 8, 2018

(51) Int. Cl.
*G05B 19/042* (2006.01)
*G05B 23/02* (2006.01)

(52) U.S. Cl.
CPC ..... *G05B 19/0426* (2013.01); *G05B 23/0264* (2013.01); *G05B 23/0294* (2013.01); *G05B 2219/31449* (2013.01)

(58) Field of Classification Search
CPC ...... G05B 19/0426; G05B 2219/31449; G05B 23/0264; G05B 23/0294; G06F 17/30312; G06F 16/22; G06Q 10/00; G06Q 10/06; G06Q 10/0631; G06Q 10/10; G06Q 10/20; G06Q 50/08; Y02P 90/86
See application file for complete search history.

(56) References Cited

U.S. PATENT DOCUMENTS

| 9,075,840 B1* | 7/2015 | Johnson ............... G06F 16/235 |
| 9,436,921 B2 | 9/2016 | Whitmore |
| 2002/0152254 A1 | 10/2002 | Teng |

(Continued)

FOREIGN PATENT DOCUMENTS

| EP | 1061423 A1 | 12/2000 |
| EP | 2595099 A1 | 5/2013 |
| KR | 101345068 B1 | 12/2013 |

OTHER PUBLICATIONS

International Search Report and Written Opinion of the International Searching Authority for International Application No. PCT/US2017/043484 dated Oct. 30, 2017, 15 pages.

*Primary Examiner* — Christopher E. Everett

(57) ABSTRACT

A system includes a first database configured to store one or more workflow templates associated with one or more workflows, where each workflow is used to implement at least one change in at least one control system of an industrial plant. The system also includes a second database configured to document each of the one or more workflows. In addition, the system includes at least one processor configured to communicate with at least one user equipment and to provide at least one user interface to the at least one user equipment. The at least one user interface is configured to provide the one or more workflow templates and to receive definitions of the one or more workflows. The at least one user interface is also configured to provide the one or more workflows for implementation of the at least one change in the at least one control system.

18 Claims, 3 Drawing Sheets

(56) References Cited

U.S. PATENT DOCUMENTS

| | | | |
|---|---|---|---|
| 2004/0010772 A1* | 1/2004 | McKenna | G06Q 10/06 |
| | | | 717/101 |
| 2004/0024662 A1 | 2/2004 | Gray et al. | |
| 2004/0153437 A1 | 8/2004 | Buchan | |
| 2004/0158484 A1* | 8/2004 | Tu | G06Q 10/06 |
| | | | 705/7.19 |
| 2011/0185315 A1* | 7/2011 | Armour | G06F 8/34 |
| | | | 715/853 |
| 2014/0330542 A1 | 11/2014 | Subramanian et al. | |
| 2015/0234381 A1 | 8/2015 | Ratilla et al. | |
| 2016/0134476 A1* | 5/2016 | Kerber | H04L 67/104 |
| | | | 709/221 |
| 2016/0232492 A1* | 8/2016 | Nalsky | G06Q 10/103 |

\* cited by examiner

WORKFLOW-BASED CHANGE MANAGEMENT AND DOCUMENTATION SYSTEM AND METHOD

TECHNICAL FIELD

This disclosure relates generally to industrial process control and automation. More specifically, this disclosure relates to a workflow-based change management and documentation system and method, such as for a manufacturing or processing plant.

BACKGROUND

Industrial process control and automation systems in manufacturing or processing plants often include components such as distributed control systems (DCSs), programmable logic controllers (PLCs), safety controllers, field devices, network devices, power supplies, and distribution devices. The configuration, orientation, location, and other details related to these components are typically documented by different vendors at the start of a plant. Interconnections, inter-dependencies, and minimum cross-information between systems are often not available because (i) the components are often prepared in isolation by different vendors and (ii) co-ordination is limited to the construction and commissioning phase of a plant.

Bringing in changes under a disciplined approval system, tracing the changes, studying impacts of the changes, and scheduling the changes in order to align production planning, automatic documentation, and best practices distribution for configuration can be very difficult. Each organization may follow its own standard process and practices for change requests. Further, cross-functional collaboration like reviews, approvals, and clearances often cannot be easily enforced. Each organization may have its own review processes and checklists that need to be enforced before a change is approved.

In some instances, change management processes are followed manually, which usually involves a lot of paperwork and can be error prone. This can also be an issue during audit and root cause analysis to trace why a change was done. Optimal management of spare components, use of uniform engineering practices, facilitating causal analysis of defects and outages, and optimal maintenance can also be difficult.

SUMMARY

This disclosure provides a workflow-based change management and documentation system and method.

In a first embodiment, a system includes a first database configured to store one or more workflow templates associated with one or more workflows, where each workflow is used to implement at least one change in at least one control system of an industrial plant. The system also includes a second database configured to document each of the one or more workflows. In addition, the system includes at least one processor configured to communicate with at least one user equipment and to provide at least one user interface to the at least one user equipment. The at least one user interface is configured to provide the one or more workflow templates and to receive definitions of the one or more workflows. The at least one user interface is also configured to provide the one or more workflows for implementation of the at least one change in the at least one control system.

In a second embodiment, a method for implementing a change in an control system of an industrial plant includes creating a workflow for the change. The method also includes assessing an impact of the change on the control system and on at least one additional control system based on an assessment checklist retrieved from a first database. The method further includes implementing the change in the control system based on an implementation checklist retrieved from the first database. The method also includes testing the change implemented in the control system based on a test checklist retrieved from the first database. In addition, the method includes documenting the workflow in a second database after completion of at least one of the assessment checklist, the implementation checklist, and the test checklist.

In a third embodiment, a method for correcting a defect in an control system of an industrial plant includes creating a work order to fix the defect, where the work order is associated with a workflow defined by information in a first database. The method also includes determining a solution for the defect based on information in a second database. The method further includes assessing an impact of the solution on the control system and on at least one additional control system based on an assessment checklist retrieved from the first database. The method also includes implementing the solution in the control system based on an implementation checklist retrieved from the first database. The method further includes testing the solution implemented in the control system based on a test checklist retrieved from the first database. In addition, the method includes documenting the work order in a second database after completion of at least one of the assessment checklist, implementation checklist, or the test checklist.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration and should not be construed in any way to limit the scope of the invention. Those skilled in the art will understand that the principles of the disclosure may be implemented in any type of suitably arranged device or system.

Industrial plants often use various control systems to perform a wide variety of operations. Configurations of the control systems are often documented individually by different vendors. In addition, changes to the configurations of the control systems (which may involve routine maintenance, updating the systems, fixing defects in the systems, or replacing the systems) may also be individually documented. Because there is no centralized system or method to perform and document changes to control systems, assessing the impacts of the changes and determining root causes of problems are often difficult. This can make it much more difficult to manage and control the control systems, which in turn can make it much more difficult to manage and control the operations of the industrial plants.

This disclosure provides a system and method for standardizing changes to control systems in an industrial plant and documenting the changes by integrating workflow management with documentation storage. Integration of the workflow management functions and documentation storage functions in a centralized system provides easier management of the control systems, permits users to easily assess the impacts of changes in one control system to other control systems, and eases root cause analysis of any defects in any of the control systems. This can help to improve management and control over the control systems, which in turn can help to improve management and control over the operations of the industrial plants.

Figure 1:
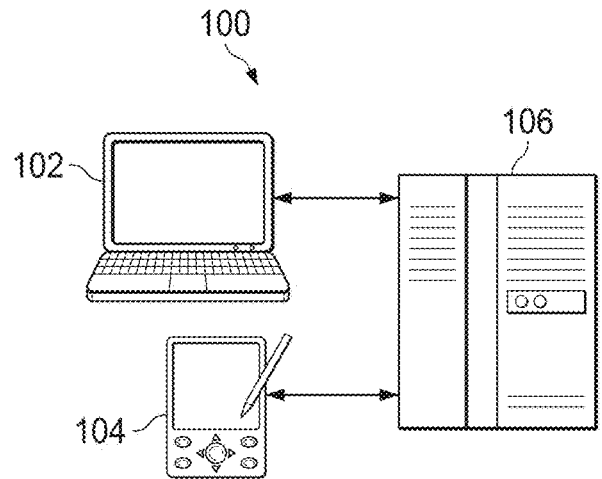
FIGS. 1 and 2 illustrate an example workflow-based change management and documentation system according to this disclosure.
Figure 2:
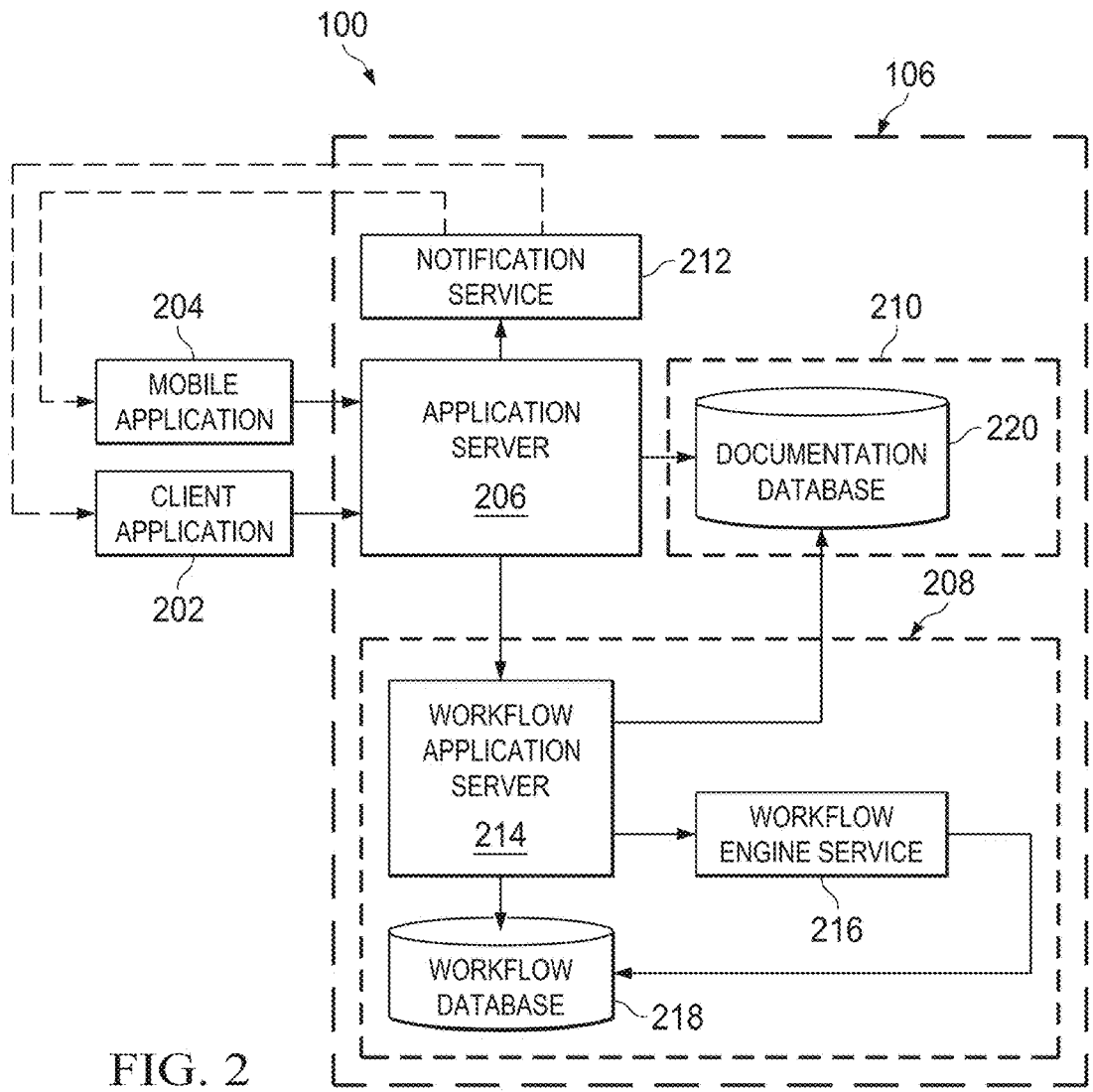

FIGS. 1 and 2 illustrate an example workflow-based change management and documentation system 100 according to this disclosure. As shown in FIG. 1, the system 100 includes one or more stationary terminals or computers 102, one or more mobile devices 104, and at least one workflow and documentation (WD) server 106. The computers 102 and mobile devices 104 denote user equipment that may communicate with the WD server 106 in any suitable manner. For example, the computers 102 or mobile devices 104 could communicate with other components wirelessly, such as via cellular, WIFI, BLUETOOTH, or other wireless communication protocols. The computers 102 or mobile devices 104 could also communicate with other components in a wired manner, such as when the computers 102 communicate via one or more ETHERNET networks or the mobile devices 104 are placed in docking stations or otherwise physically coupled to an external device.

As described in more detail below, the WD server 106 supports a workflow-based change management and documentation system. The WD server 106 therefore supports workflow-based change management that is integrated with a centralized documentation system. The workflow feature permits the enforcement of processes and practices for an organization through workflow steps, states, and approvals. The workflow feature also permits enforcement of safety and security checklists and compliance audits, such as those mandated by an organization.

The WD server 106 permits users (such as via the computers 102 or mobile devices 104) to define maintenance tasks (such as remedial, preventive, and periodic tasks) in the operation of an industrial plant as categorical workflows. The tasks may be initiated and traced through completion, tested, and documented under a digital template provided by the system. Approvals, reviews, and cross-function communications may be done electronically and may be easily archived. Audits required for compliance and other needs can be easily supported. All reference documents of various systems and interconnections between systems in an industrial plant may be easily available with the workflow system.

The workflow feature enables bi-directional traceability from a change record to a workflow and from a workflow to a corresponding change record and permits management of defects found in a system. This enables a standard organization process to be enforced based on a root cause of a defect. A workflow template allows organizations to create templates for their maintenance processes for handling defects and change request work orders.

A tighter integration of the workflow system with a documentation system enables mapping of impacted objects into workflows, which may assist in determining impacts of changes. Tighter integration with the documentation system also enables mapping of changes to corresponding change request workflows. Any change that is not mapped to a change request workflow may not be approved due to such changes being dangerous, such as from a security or safety point of view.

FIG. 2 illustrates additional details of an example implementation of the workflow-based change management and documentation system 100, including the WD server 106. As shown in FIG. 2, a client application 202 generally provides user access to the system 100. The client application 202 may be stored and executed by the computers 102 shown in FIG. 1. The client application 202 allows users to access and review engineering documentation, changes, or defects. The client application 202 also enables the study of impact assessment when making certain changes in industrial process control and automation systems. The client application 202 may further be used to track changes and associate the changes with corresponding change request workflows. In addition, the client application 202 may be used to interact with workflow applications, such as to support the creation of workflow templates, the initiation of a workflow instance for a changes request, the addition of an impact assessment, the performance of a checklist, or the requesting of an approval.

A mobile application 204 also generally provides user access to the system 100, but the mobile application 204 may be stored and executed by the mobile devices 104 shown in FIG. 1. The mobile application 204 could support the same or similar functions as the client application 202 while being suitable for use by mobile devices.

The WD server 106 represents at least one computing device configured to transmit, receive, and store data and to execute applications. The WD server 106 may be implemented as a single computing device or as a collection of computing devices. In this example, the WD server 106 includes or supports an application server 206, a workflow system 208, a documentation system 210, and a notification service 212. The application server 206 generally provides application processing and rules for the documentation system 210. For example, the application server 206 can collect data from and transmit data to the client applications 202 and the mobile applications 204. The application server 206 can also route data to and from the workflow system 208, documentation system 210, and notification service 212. The application server 206 denotes any suitable structure for transmitting and/or receiving data and executing an application based on the data.

The workflow system 208 includes a workflow application server 214, a workflow engine service 216, and a workflow database 218. The workflow application server 214 is configured to transmit, receive, and store data and to execute applications related to workflow management. The workflow application server 214 may be implemented separate from the application server 206 or on the same device(s) as the application server 206. The workflow application server 214 is responsible for handling application processing and rules for one or more workflows. The workflow application server 214 is also responsible for visualization of workflow steps and current states. The visualization of workflow steps and current states can be provided to the client applications 202 or mobile applications 204, such as via a graphical user interface (GUI), and used by users to interact with workflows, perform steps involved in the workflows, and conduct approvals. The workflow application server 214 can also be responsible for providing a GUI to the client applications 202 or mobile applications 204 used for authoring workflow templates.

The workflow engine service 216 performs state management of running workflows, such as by performing time-based processing of workflow states, transitions, and notifications. For example, if a workflow approval is pending for more than a predetermined time period (such as two days), the workflow engine service 216 may determine that a remainder notification should be provided to the appropriate party. In some embodiments, the workflow engine service 216 represents an application that may be executed in the background of the WD server 106.

The workflow database 218 represents an organized collection of data regarding workflow templates and workflow instances. For example, the workflow database 218 could include workflow templates, each of which may include a list of one or more steps that need to be performed at each stage of the workflow. The workflow database 218 may also include the current state and step information of each workflow in progress. The workflow database 218 may further store information on completed workflows, as well as the final disposition of the completed workflows. The workflow database 218 may be implemented in any suitable manner, such as within a single database or multiple databases.

The documentation system 210 includes a documentation database 220. The documentation database 220 represents a centralized organized collection of data regarding systems in an industrial manufacturing or processing plant, such as process control and automation system components implemented in the plant. For example, the documentation database 220 could include engineering configurations of controls & instrumentation (C&I) systems in a plant. The documentation database 220 could also include changes in engineering configurations or defects that are identified in the engineering configurations. The documentation database 220 may be implemented in any suitable manner, such as within a single database or multiple databases. The workflow database 218 and the documentation database 220 could also be implemented using the same database(s) or using different databases.

The notification service 212 is responsible for sending notifications to users of the system 100. For example, the notification service 212 could generate email messages, text messages, or push notifications for the users. Any actions taken by the users in response to the notifications can be provided to the application server 206. In some embodiments, the notification service 212 represents an application that may be executed in the background of the WD server 106.

Additional details regarding specific operations involving the WD server 106 are provided below. Note that these details are examples only and that the WD server 106 could be used in a wide variety of ways in a wide variety of industrial settings.

Although FIGS. 1 and 2 illustrate one example of a workflow-based change management and documentation system 100, various changes may be made to FIGS. 1 and 2. For example, various components in FIG. 2 could be combined, further subdivided, rearranged, or omitted and additional components could be added according to particular needs.

Figure 3:
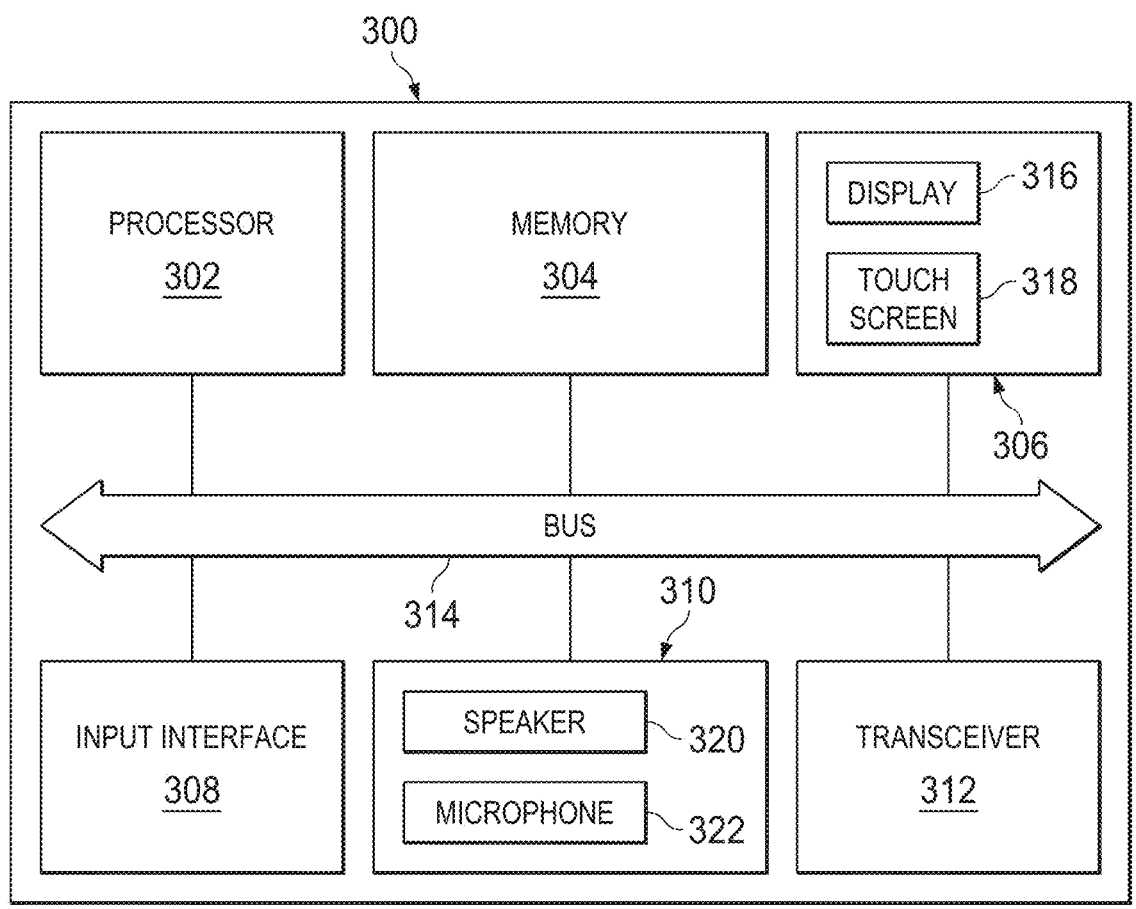
FIG. 3 illustrates an example client device for use in a workflow-based change management and documentation system according to this disclosure.

FIG. 3 illustrates an example client device 300 for use in a workflow-based change management and documentation system according to this disclosure. In particular, FIG. 3 illustrates an example of the terminal or computer 102 or the mobile device 104 for use in the workflow-based change management and documentation 100 of FIG. 1. However, the client device 300 could be used in any other workflow-based change management and documentation system.

As shown in FIG. 3, the client device 300 includes at least one processor 302 and at least one memory 304. The processors 302 generally operate to process data and control the overall operation of the client device 300. Each processor 302 denotes any suitable processing device, such as a microprocessor, microcontroller, digital signal processor, central processing unit (CPU), application processor (AP), communication processor (CP), field programmable gate array, application specific integrated circuit, or discrete logic devices. Each memory 304 is used to store and facilitate retrieval of instructions and data used, generated, or collected by the client device 300. Each memory 304 includes any suitable volatile or non-volatile memory device.

The client device 300 also includes or supports at least one display device 306. The display devices 306 can be used to present information to a user and optionally to receive input from a user. For example, the display devices 306 could include a display 316 and a touch screen 318 (which could be integrated into a single touch screen display). The display 316 could present a user interface (UI) that permits a user to interact with the client device 300 and any software or programs being executed on the client device 300 or on another device (such as the WD server 106). The touch screen 318 may capture user input when a user taps, slides, or otherwise touches the touch screen 318.

In addition, the client device 300 includes at least one input interface 308, at least one audio device 310, at least one transceiver 312, and at least one bus 314. The input interfaces 308 support the receipt of data from one or more input devices in any suitable manner. For example, an input interface 308 could receive input from a keyboard, a keypad, a mouse, an electronic pen or stylus configured to interact with the display devices 306, or a touch pad. The audio devices 310 may include at least one speaker 320 for presenting audio content and at least one microphone 322 for capturing audio signals.

The transceivers 312 can communicate data to or from the client device 300 in any suitable manner. As noted above, any suitable communication protocol(s) could be supported by the transceiver(s) 312, such as cellular, WIFI, BLUETOOTH, ETHERNET, or any other or additional wireless or wired protocols. The transceivers 312 can support the transmission and reception of any suitable data. For example, a transceiver 312 could transmit completed steps and approvals of a workflow to the WD server 106. The transceiver 312 could also transmit data generated via voice recognition or manual entry.

Each bus 314 denotes any suitable communication bus that interconnects and delivers data or other signals between components 302-312. While one bus 314 is shown here, different buses 314 could couple different components in the computer 102, or components could be coupled directly together without the need for a shared bus.

Although FIG. 3 illustrates one example of a client device 300 for use in a workflow-based change management and documentation system, various changes may be made to FIG. 3. For example, various components in FIG. 3 could be combined, further subdivided, rearranged, or omitted and additional components could be added according to particular needs. Also, computers and mobile devices come in a wide variety of configurations, and FIG. 3 does not limit this disclosure to any particular computer or mobile device.

Figure 4:
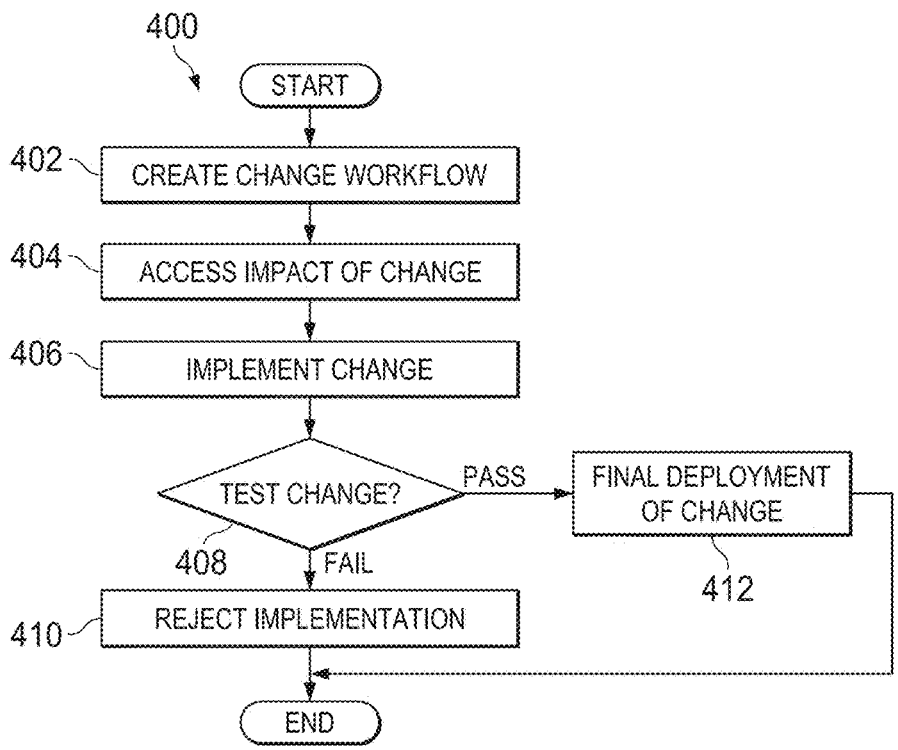
FIG. 4 illustrates an example workflow method for implementing a change according to this disclosure.

FIG. 4 illustrates an example workflow method 400 for implementing a change according to this disclosure. For ease of explanation, the method 400 of FIG. 4 is described with respect to the WD server 106 of FIG. 2 operating in the system 100 of FIG. 1. However, the workflow method 400 could be used by any other suitable device and in any other suitable system.

As shown in FIG. 4, a change workflow is created by a user at step 402. When an control system in a plant needs routine maintenance, needs to be updated, or needs to be replaced, a change workflow is created. This could include, for example, the WD server 106 receiving a request for a change from the client application 202 or the mobile application 204. In the following discussion, it may be assumed that the change request originated from the mobile application 204 of the mobile device 104, but the change request could just as easily originate from the client application 202 of the computer 102. When the change workflow is created, the workflow database 218 provides a workflow template to the user via the workflow application server 214. The workflow template represents a definition for a workflow instance that allows a user to describe the states, steps, transition conditions, checklists, and/or approvals to be taken to complete a workflow. In some embodiments, if a workflow template is not available, the workflow application server 214 could provide a GUI to the user via the mobile application 204 to create a workflow. Once the workflow template is selected or created, it is provided to a user for approval. Once approved, the created workflow is then documented in the documentation database 220.

Once the workflow is created, an impact of the change is assessed at step 404. This could include, for example, the WD server 106 assessing the impact that the change would have on C&I systems or other systems of the plant based on information stored in the documentation database 220. This could be done automatically or based on input that the WD server 106 receives from other users. As a particular example, the WD server 106 could contact and receive input from one or more other users, such as a maintenance engineer. This could allow the maintenance engineer to receive an assessment checklist from the workflow database 218 that includes the steps to assess the impact on the C&I or other systems of the plant. As the maintenance engineer checks off each item on the assessment checklist, the application server 206 can document the completed step in the documentation database 220 and the workflow application server 214. Once all steps of the assessment checklist are completed, the application server 206 may cause the notification service 212 to notify yet another user, such as a manager, that additional approvals are needed. Once the additional approval is received, the additional approval is recorded in the workflow application server 214 and the documentation database 220.

Once the needed approvals are obtained, the change is implemented at step 406. This could include, for example, the WD server 106 providing one or more of the users (such as a maintenance engineer) with an implementation checklist from the workflow database 218. As the maintenance engineer checks off each item on the implementation checklist, the application server 206 documents the completed step in the documentation database 220 and the workflow application server 214. Once all steps of the implementation checklist are completed, the application server 206 may cause the notification service 212 to notify a user, such as a manager, that an approval of the implemented change is needed. Once the approval is received, the approval is recorded in the workflow application server 214 and the documentation database 220.

The change is then tested at step 408. This could include, for example, the WD server 106 providing one or more of the users (such as a maintenance engineer) with a test checklist from the workflow database 218. As the maintenance engineer checks off each item on the test checklist, the application server 206 documents the completed step in the documentation database 220 and the workflow application server 214. Once all steps of the test checklist are completed (or if not all steps can be completed), the WD server or at least one user (such as the maintenance engineer or a manager) determines if the test passed or failed.

If the test failed, the implementation of the change is rejected, and the change is not deployed at step 410. In this case, the application server 206 could cause the notification service 212 to request approval for not deploying the change. If the test passed, the change is deployed, such as into one or more C&I or other systems of an industrial process control and automation system, at step 412. This could include, for example, the WD server 106 providing at least one of the users (such as a maintenance engineer) with a deployment checklist from the workflow database 218. As the maintenance engineer checks off each item on the deployment checklist, the application server 206 documents the completed step in the documentation database 220 and the workflow application server 214. Once all steps of the deployment checklist are completed, the application server 206 may cause the notification service 212 to notify a user, such as a manager, that an approval is needed. Once the approval is received, the completed workflow is recorded in the workflow database 218 and the documentation database 220.

Figure 5:
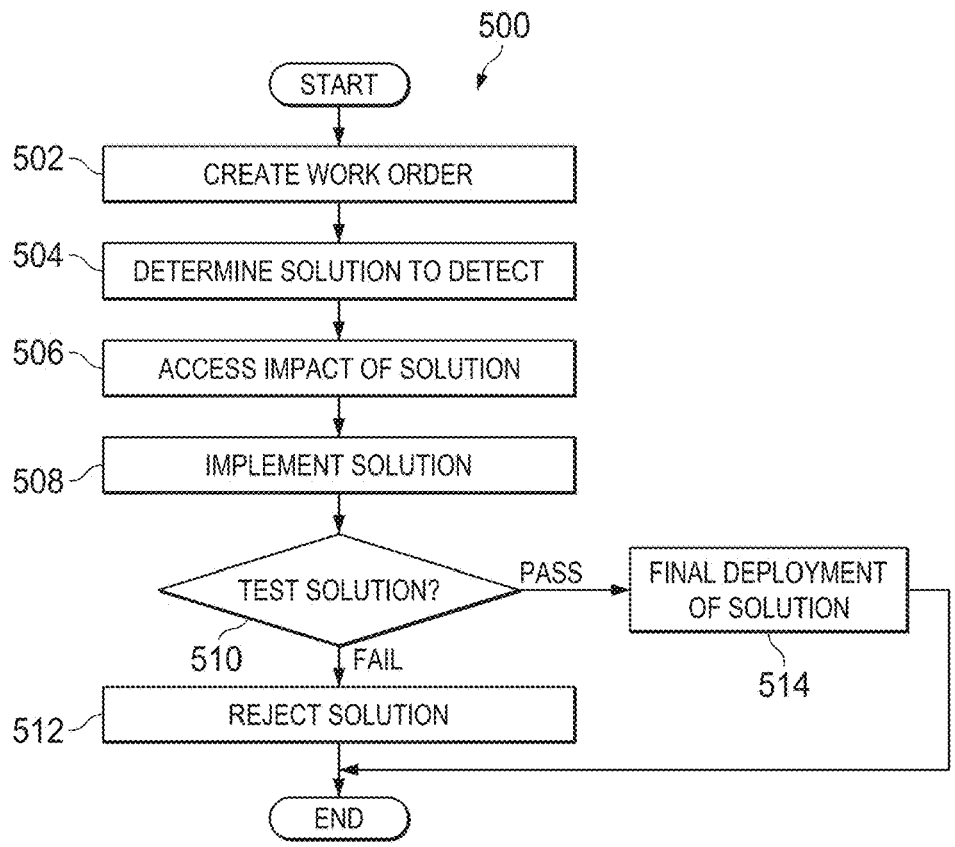
FIG. 5 illustrates an example workflow method for fixing an engineering defect according to this disclosure.

FIG. 5 illustrates an example workflow method 500 for fixing an engineering defect according to this disclosure. For ease of explanation, the method 500 of FIG. 5 is described with respect to the WD server 106 of FIG. 2 operating in the system 100 of FIG. 1. However, the workflow method 500 could be used by any other suitable device and in any other suitable system.

As shown in FIG. 5, a work order is created by a user at step 502. When a defect is identified in a control system in a plant, a work order is created to correct the defect. This could include, for example, the WD server 106 receiving a request to create a work order from the client application 202 or the mobile application 204 due to a defect associated with an industrial plant. In the following discussion, it may be assumed that the request originated from the mobile application 204 of the mobile device 104, but the request could just as easily originate from the client application 202 of the computer 102. When the work order is created, the workflow database 218 can provide a workflow template to the user via the workflow application server 214. As described above in FIG. 4, the workflow template may be retrieved from the workflow database 218 or created by a user. Once the workflow template is selected or created, it can be provided to a user for approval. Once approved, the created work order is then documented in the documentation database 220.

Once the work order is created, a solution for the defect is determined at step 504. This could include, for example, the WD server 106 or a user determining the solution by determining a root cause of the defect based on information in the documentation database 220. Such information in the documentation database 220 may include past configurations of C&I or other systems, changes to the C&I or other systems that have been implemented, tested, or deployed, or current configurations of the C&I or other systems.

Once a solution is determined, the impact of the solution is assessed at step 506. This could include, for example, the WD server 106 or a user, such as a maintenance engineer, assessing the impact that the solution would have on the C&I or other systems of the plant based on information stored in the documentation database 220. As a particular example, the maintenance engineer may receive a checklist from the workflow database 218 that includes the steps to assess the impact on the C&I or other systems of the plant. As the maintenance engineer checks off each item on the assessment checklist, the application server 206 documents the completed step in the documentation database 220 and the workflow application server 214. Once all steps of the assessment checklist are completed, the application server 206 may cause the notification service 212 to notify a user, such as a manager, that an approval is needed. Once the approval is received, the approval is recorded in the workflow application server 214 and the documentation database 220.

The solution is implemented at step 508. This could include, for example, the WD server 106 providing a user, such as a maintenance engineer, with an implementation checklist from the workflow database 218. As the maintenance engineer checks off each item on the implementation checklist, the application server 206 documents the completed step in the documentation database 220 and the workflow application server 214. Once all steps of the implementation checklist are completed, the application server 206 may cause the notification service 212 to notify a user, such as a manager, that an approval is needed. Once the approval is received, the approval is recorded in the workflow application server 214 and the documentation database 220.

The solution is tested at step 510. This could include, for example, the WD server 106 providing one or more of the users (such as a maintenance engineer) with a test checklist from the workflow database 218. As the maintenance engineer checks off each item on the test checklist, the application server 206 documents the completed step in the documentation database 220 and the workflow application server 214. Once all steps of the test checklist are completed (or if not all steps can be completed), the WD server or at least one user (such as the maintenance engineer or a manager) determines if the test passed or failed.

If the test failed, the implemented solution is rejected, and the solution is not deployed at step 512. The application server 206 may cause the notification service 212 to request approval for not deploying the change. If the test passed, the implemented solution is deployed, such as into one or more C&I or other systems of an industrial process control and automation system, at step 514. This could include, for example, the WD server 106 providing at least one of the users (such as a maintenance engineer) with a deployment checklist from the workflow database 218. As the maintenance engineer checks off each item on the deployment checklist, the application server 206 documents the completed step in the documentation database 220 and the workflow application server 214. Once all steps of the deployment checklist are completed, the application server 206 may cause the notification service 212 to notify a user, such as a manager, that an approval is needed. Once the approval is received, the completed workflow is recorded in the workflow database 218 and the documentation database 220.

Although FIGS. 4 and 5 illustrate examples of workflow methods 400 and 500, various changes may be made to FIGS. 4 and 5. For example, while shown as a series of steps, various steps in each figure could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a first database configured to store one or more workflow templates associated with one or more workflows, each of the one or more workflows used to implement at least one change in at least one control system of an industrial plant;
a second database configured to store one or more documents for each of the one or more workflows, wherein the documents include engineering configurations of controls & instrumentation (C&I) systems along with changes in engineering configurations that are identified in the engineering configurations in the at least one control system; and
at least one processor configured to communicate with at least one user equipment and to provide at least one user interface to the at least one user equipment, the at least one user interface configured to provide the one or more workflow templates and to receive definitions of the one or more workflows, the at least one user interface also configured to provide the one or more workflows for implementation of the at least one change in the at least one control system; and
wherein in response to receiving a change request in the at least one control system change to at least one control system of the industrial plant from a user via the at least one user interface, the at least one processor is configured to:
when a workflow template from the one or more workflow templates for the control system change requested by the change request is available in the first database, provide the workflow template for the control system change to the user via the at least one user interface;
when the workflow template from the one or more workflow templates for the control system change requested by the change request is not available in the first database, provide a graphical user interface to the user via the at least one user interface for creating a workflow template for the control system change requested by the change request;
receive approval of the provided workflow template for the control system change; and
automatically assess an impact of change in workflow for the control system change requested by the change request on the control system that the control system change was requested and at least one other control system of the industrial plant.

2. The system of claim 1, further comprising:
a workflow engine service configured to perform state management of the one or more workflows.

3. The system of claim 1, wherein the first database is further configured to store information identifying completed workflows.

4. The system of claim 1, further comprising:
a notification service configured to notify one or more users, via the at least one user equipment, of one or more states of the one or more workflows.

5. The system of claim 1, wherein the first and second databases reside within a single database structure.

6. The system of claim 1, wherein:
the one or more workflows comprise multiple workflows; and
the multiple workflows include (i) workflows for maintaining, updating, and replacing multiple control systems of the industrial plant and (ii) workflows for correcting defects in configurations of the control systems.

7. The system of claim 6, wherein the multiple workflows further include:
checklists used to assess impacts of different changes to the control systems on other control systems;
checklists used to implement the changes to the control systems; and
checklists used for testing the changes to the control systems.

8. A method for implementing a change in a control system of an industrial plant, the method comprising:
presenting a graphical user interface for creating a workflow for the change;
receiving a created workflow and documenting the created workflow in a documentation database;
in response to receiving and document the created workflow, providing an assessment checklist retrieved from a workflow database, the assessment checklist including one or more steps to complete and is configured to assist a user in assessing an impact of the change on the control system and on at least one additional control system;
as the steps of the assessment checklist are completed, a processor documenting the completed steps of the assessment checklist in the documentation database;
in response to completing all of the steps of the assessment checklist, the processor requesting approval of the created workflow;
in response to receiving approval of the created workflow, providing an implementation checklist retrieved from a first database, the implementation checklist includes one or more steps to complete and is configured to assist the user in implementing the change in the control system;
as the steps of the implementation checklist are completed, the processor documenting the completed steps of the implementation checklist in the documentation database;
providing a test checklist retrieved from the first database, the test checklist includes one or more steps to complete and is configured to assist the user in testing the change implemented in the control system;
as the steps of the test checklist are completed, the processor documenting the completed steps of the test checklist in the documentation database; and
documenting the workflow in the documentation database by storing one or more documents after completion of at least one of the assessment checklist, the implementation checklist, and the test checklist, wherein the documents include engineering configurations of controls & instrumentation (C&I) systems along with changes in the engineering configurations that are identified in the engineering configurations in the at least one control system.

9. The method of claim 8, wherein creating the workflow comprises retrieving a workflow template from the first database.

10. The method of claim 8, wherein creating the workflow comprises creating a workflow template using at least one user equipment.

11. The method of claim 8, further comprising:
for each step of the checklists requiring approval, transmitting one or more notifications to one or more users requesting the approval.

12. The method of claim 8, further comprising:
deploying the change to the control system in response to successful testing of the change.

13. The method of claim 8, wherein the change alters operation of the control system and thereby alters operation of the industrial plant.

14. A method for correcting a defect in a control system of an industrial plant, the method comprising:
presenting a graphical user interface for creating a work order to fix the defect, the work order associated with a workflow defined by information in a first database;
retrieving information in a second database to assist a user in determining a solution;
receiving the solution and a processor documenting the solution in the second database;
in response to receiving and documenting the solution in the second database, providing an assessment checklist retrieved from the first database, the assessment checklist configured to assist a user in assessing an impact of the solution on the control system and on at least one additional control system;
in response to completing the assessment checklist, the processor requesting approval for the solution;
in response to receiving approval of the solution, providing an implementation checklist retrieved from the first database, the implementation checklist is configured to assist a user in implementing the solution in the control system;
providing a test checklist retrieved from the first database, the test checklist is configured to assist a user in testing the solution implemented in the control system; and
documenting the work order in the second database by storing one or more documents after completion of at least one of the assessment checklist, the implementation checklist, and the test checklist, wherein the documents include engineering configurations of controls & instrumentation (C&I) systems along with changes in the engineering configurations that are identified in the engineering configurations in the at least one control system; and
wherein:
each of the assessment checklist, implementation checklist, and the test checklist includes multiple steps; and
the method further comprises:
receiving an indication that each of the multiple steps has been completed; and
documenting each completed step in the second database as the step is completed.

15. The method of claim 14, wherein creating the work order comprises retrieving a workflow template from the first database.

16. The method of claim 14, wherein creating the work order comprises creating a workflow template using at least one user equipment.

17. The method of claim 14, further comprising:
deploying the solution to the control system in response to successful testing of the change.

18. The method of claim 14, wherein the solution alters operation of the control system and thereby alters operation of the industrial plant.

* * * * *